Patented May 11, 1948

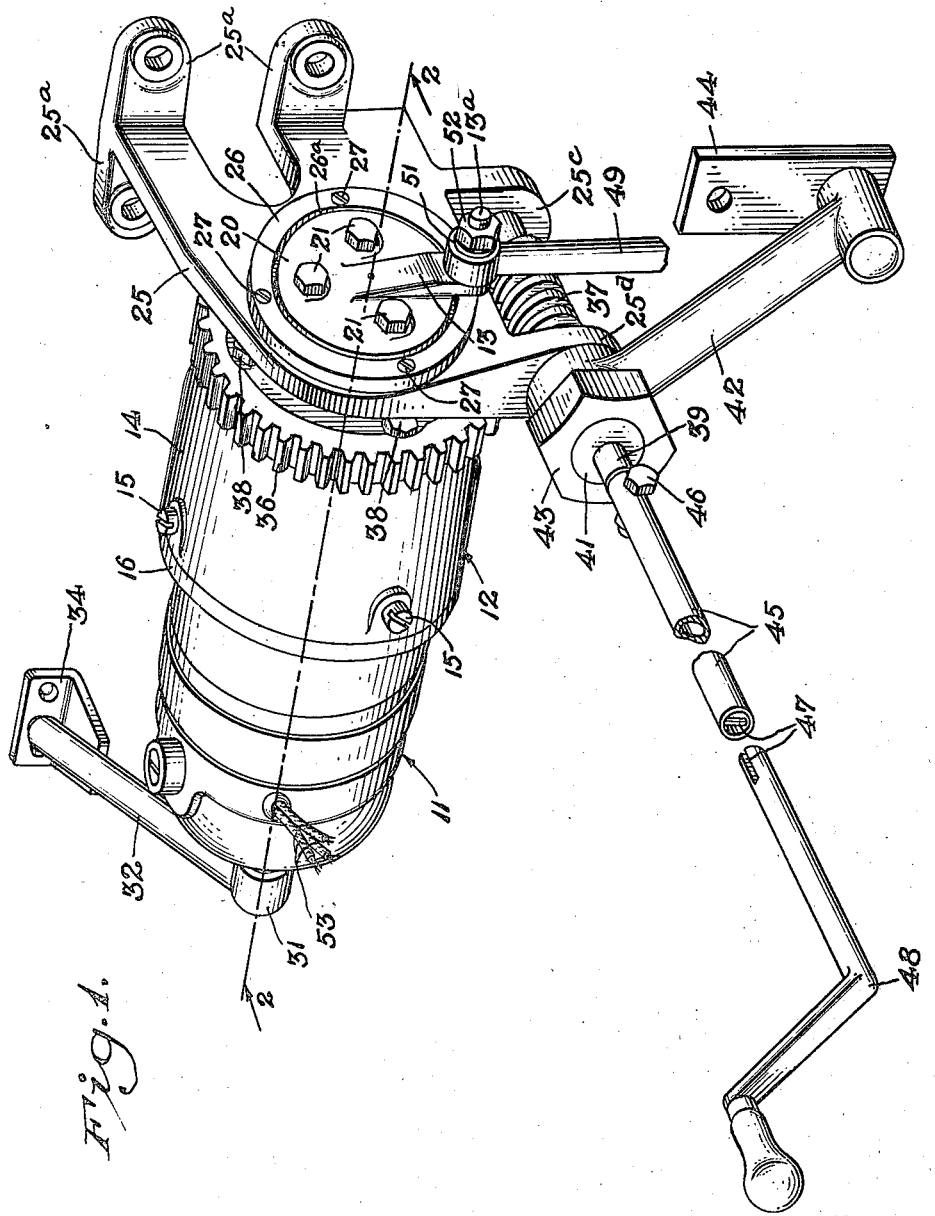

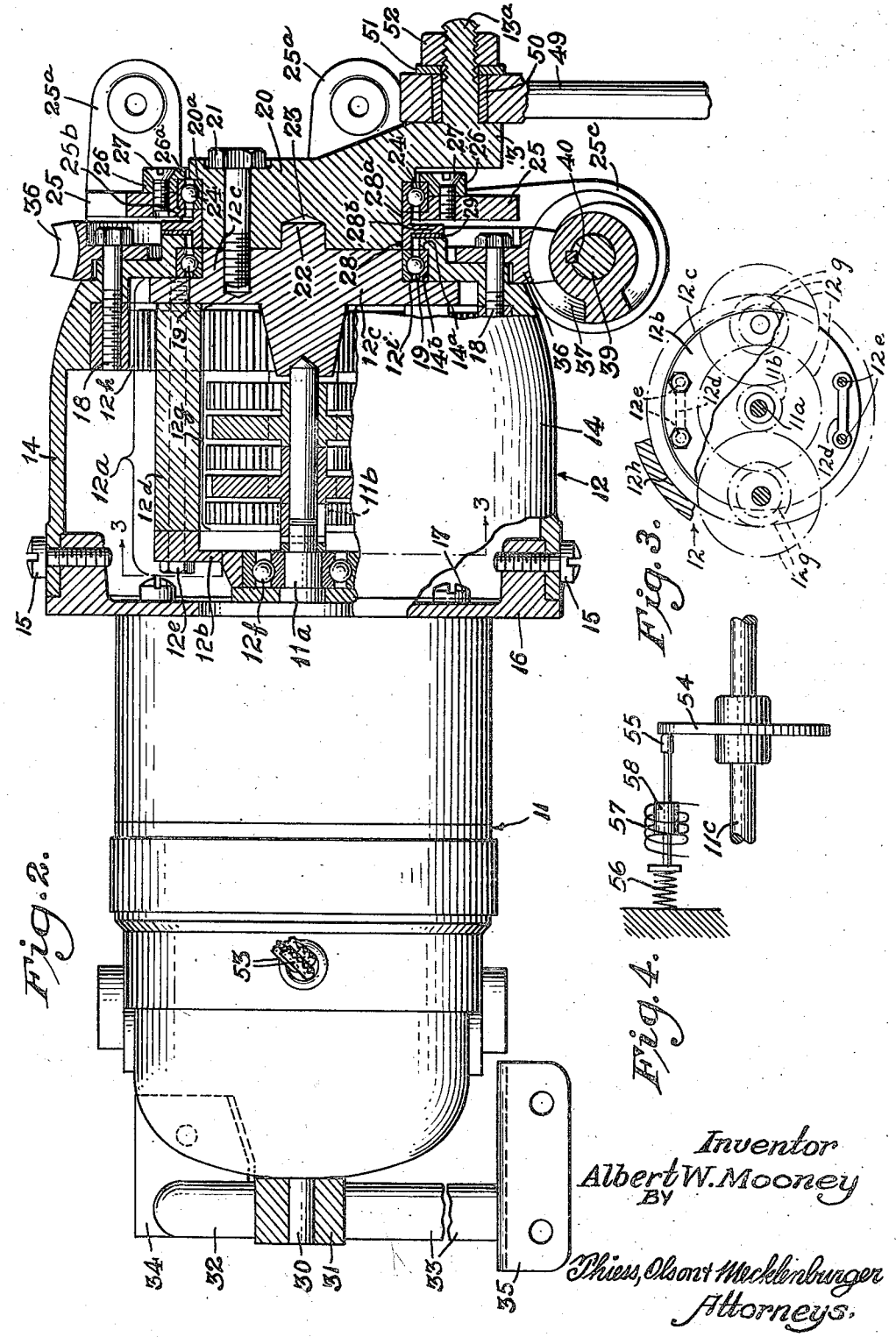

2,441,247

UNITED STATES PATENT OFFICE 2,441,247

MECHANICAL TRANSLATING DEVICE

Albert W. Mooney, Wichita, Kans.

Application June 17, 1944, Serial No. 540,864

1 Claim. (Cl. 74—407)

This invention relates to mechanical translating devices and has particular relation to devices for effecting desired mechanical movements by the selective operation of a plurality of prime movers or sources of power application.

Such devices are particularly useful in mechanisms wherein it is necessary or desirable that emergency operating means be provided for use in case of failure of the normally used operating means, the emergency means frequently, although not necessarily, taking the form of manually operable means. The present invention is particularly well suited for uses in which the desired ultimate movement is effected at relatively slow speed and relatively high torque acting through a comparatively short distance, but advantageous applications may also be made to other types of operations.

One example of a use to which the invention may be applied to good advantage is the actuation of retractable landing gear of aircraft. The invention is also useful for the operation of various other aircraft parts or devices, such as movable flaps, stabilizers and other members, as well as mechanisms in other fields of application.

Devices heretofore proposed for accomplishing functions such as those above referred to have been subject to various objections. A particularly objectionable feature in many such constructions is the necessary provision of clutches or clutching and declutching means of one kind or another for disengaging the mechanism to be actuated from one of the sources of power when the other source is to be utilized. These clutches are subject to failure in various respects and to operating objections, such as the difficulty, time delay and operational complication involved in their use. They also involve added weight, mechanical complication and expense, all of which factors involve serious disadvantages in various types of applications.

The primary object of the present invention is to provide a mechanical translating device for effecting a desired mechanical movement by the selective operation of a plurality of prime movers or sources of power application, without involving any of the above-mentioned disadvantages. In particular, it is an object of the invention to provide a mechanism for effecting the indicated type of operation without the employment of any clutches or similar devices, and in this manner and otherwise to provide a relatively lightweight mechanism for effecting the desired results.

A further important object of the invention is to provide a device of the above-indicated character which shall have an extremely high degree of reliability of operation, thus affording a very high factor of safety, particularly where one of the selectively used prime movers or sources of power is an emergency source to be utilized in effecting a vital operation upon failure of the source normally used for that purpose.

A further object of the invention is to provide a device of the above-indicated character which shall be simple and economical to construct and to install in any construction wherein it is to be employed and which shall afford ready replacement of units and parts and require a minimum of attention in service.

In carrying out the invention in one form, a device is provided which comprises a power-delivering crank for effecting the desired mechanical movement. This crank is normally driven by an electric motor acting through a speed-reducing mechanism. The motor, speed-reducing mechanism and crank are constructed as a unit assembly which is mounted for rotary movement about an axis coinciding with the axis of the power-delivering crank. Means are provided for rotating this assembly about the said axis by the selective application of an alternative source of power or driving force, such as a manually operated hand crank connected to the unit through a suitable worm and worm wheel.

In this embodiment of the invention the motor may be utilized as the normal source of power to actuate the power-delivering crank through the speed-reducing mechanism, in which case the unit assembly is secured against rotation about its axis by reason of the fact that the worm and gear connection thereto from the hand crank or other alternative power source constitutes a non-invertible power transmission. In case the motor fails or it is desired for any other reason to use the hand crank or other alternative power source for effecting the desired mechanical movement, this operation effects rotation of the assembly, including the power-delivering crank, about its axis. Under this operating condition the motor is not energized and the power-delivering crank is effectively locked in position with respect to the entire rotatably mounted assembly because the speed-reducing unit is either inherently non-invertible or of such a high reduction ratio that the friction therein and in the motor bearings, brushes, etc., will prevent inverted operation thereof. For this purpose the friction inherent in the mechanism may be deliberately augmented, if desired, by the provision of a suitable artificial friction device.

This construction and combination, therefore, provides a simple and reliable mechanism for effecting a desired mechanical movement without the employment of any clutches or similar devices requiring actuation for the purpose of selecting the prime mover or source of power to be utilized.

The invention will be better understood and other objects and advantages thereof will appear from a consideration of the following detailed description, taken in conjunction with the accompanying drawings, in which Fig. 1 is a perspective view of a device constituting a preferred embodiment of the invention;

Fig. 2 is a view of the same device partly in elevation and partly in section taken on a vertical plane through the axis indicated by the line 2—2 in Fig. 1;

Fig. 3 is a partly diagrammatic view, on a smaller scale, taken on a plane indicated by the line 3—3 in Fig. 2, showing, partly in end elevation and partly in section and with certain parts broken away, a speed-reducing unit incorporated in the said device; and Fig. 4 is a diagrammatic illustration of an electrically controlled braking device which may be incorporated in certain embodiments of the invention.

The device illustrated in the drawings comprises an electric motor 11, a speed-reducing unit 12, and a power-delivering crank 13. The motor 11 has a conventional rotor element (not shown) which is connected directly to the input end of the speed-reducing unit 12, and the crank 13 is connected directly to the output end of said unit. This speed-reducing unit may be of any suitable type well known in the art, such as a worm-gear reduction unit, a planetary gear unit or the like. The details of this unit are not essential to the present invention but a suitable example thereof is illustrated in Figs. 2 and 3 and will be described briefly. The mechanism is encased in a housing consisting of a substantially cylindrical or bell-shaped portion 14 secured by screws 15 to an end housing portion 16, which in turn is secured by screws 17 to the housing or stator element of the motor 11.

The speed-reducing mechanism is of the planetary type and comprises a planet assembly 12a including annular end members 12b and 12c with spacing members 12d therebetween, all secured together by bolts or studs 12e. The left-hand end member 12b is rotatably carried by an antifriction bearing 12f supported upon an extension 11a of the shaft of the motor 11, which also carries a pinion 11b to drive a train of gears 12g journaled within the planet assembly. The final gear of this train, at the right-hand end thereof as viewed in Fig. 2, meshes with a stationary internal gear 12h secured to the inside of the housing portion 14 by bolts or studs 18, which also serve another purpose to be referred to hereinafter.

The right-hand end member 12c of the planet assembly is rotatably supported in the end of the housing portion 14 by means of an antifriction bearing 19, which is, of course, coaxial with the shaft of the motor 11, the bearing 12f and the internal gear 12h. The planet assembly is thus rotatable about this common axis and when its gear train 12g is actuated by the motor 11 the rotation of the final driven gear thereof in mesh with the stationary internal gear 12h is trans-
lated into rotation of said planet assembly. The end member 12c thereof is thus the final driven element of the speed-reducing mechanism.

The power-delivering crank 13 is integrally formed with a disc or plate portion 20 which is secured by bolts or studs 21 to the outer face of the driven element 12c of the speed-reducing mechanism and is centered thereon by means of an axial extension 22 on said element which enters in closely fitting relationship an axial bore 23 in the abutting surface of the said plate or disc portion 20. The crank 13 is thus rigidly secured to the driven element 12c of the speed-reducing unit 12 and is rotatably mounted by means of the bearing 19 with respect to the housing 14 of said speed-reducing unit, which housing, as already described, is rigidly secured to the housing or stator element of the motor 11.

As viewed in the drawings, the right-hand end of the assembly comprising the units or elements 11, 12 and 13 is rotatably supported by an antifriction bearing 24 carried by a bracket or mounting member 25 having lugs or feet 25a for attachment to any suitable support. The mounting of the bearing 24 in the bracket 25 is effected by means of a flanged plate 26 secured by screws 27 against the outer face of the bracket 25. This bracket and the plate 26 are formed with opposed flanges 25b and 26a, respectively, between which the outer race member of the bearing 24 is interposed and securely held when these elements are assembled and secured together by means of the screws 27.

The inner race member of the bearing 24 is held in assembled relationship with the plate or disc portion 20 between a flange or shoulder portion 20a of the latter and one end of an inner, cylindrical ring portion 28a of an annular spacing member 28 of T-shaped cross-section. The opposite end of the ring portion 28a abuts against the outer surface of the inner race member of the antifriction bearing 19 and thereby holds this bearing in the assembly against a flange or shoulder portion 12i of the driven element 12c of the speed-reducing mechanism. The outer race member of this bearing 19 is positioned and held between the said flange or shoulder portion 12i and a flange or shoulder portion 14a on the end wall of the housing portion 14, which is bored or recessed as shown at 14b to receive said outer race member. The assembly is sealed against infiltration of dirt, leakage of lubricant, etc., by means of a sealing member such as a felt washer or spacer 29 interposed between the outer surface of the flange or shoulder portion 14a of the housing and the adjacent opposed face of an annular flange portion 28b of the spacing member 28.

As set forth in the foregoing description, the right-hand end of the assembly of mechanism including the motor 11, the speed-reducing unit 12 and the power-delivering crank 13 is rotatably mounted in a fixed support by means of the mounting or bracket member 25. The axis of this mounting is the axis of rotation of the crank 13 and coincides with the axis of rotation of the final driven element 12c of the speed-reducing unit, since the bearings 19 and 24 are coaxial. The opposite end of the entire assembly referred to is likewise rotatably mounted on the same axis, such mounting being effected by means of a shaft or pintle 30 secured to or projecting from the end of the housing of the motor 11 and journaled in a bearing 31 supported by arms 32 and 33. The arms 32 and 33 in turn are supported by bracket or mounting members 34 and 35, respectively, which may be secured to a suitable support in the same manner as the bracket or mounting member 25.

Since the axis of the bearing 31 is the same as that of the bearing 24 at the right-hand end of the unit, it will be seen that the entire assembly above referred to is mounted for unitary rotation about said axis, which is the same as the axis of rotation of the power-delivering crank 13. Provision is made for effecting such unitary rotation by means of a worm gear 36 and a worm 37 intermeshing therewith. The gear 36 is positioned with its axis of rotation coinciding with that of the crank 13 and the above-mentioned assembly including the same, and is fixedly secured in this relationship to the housing portion 14 of the speed-reducing unit 12 by means of the bolts or studs 18, which also serve to hold the internal gear 12h in place within the said housing portion as previously described. The worm 37 is mounted on a shaft 39 and is secured in fixed position relative thereto by a key 40. The shaft 39 is carried by journal supports 25c and 25d formed integrally with and extending downwardly from the bracket member 25. As shown in Fig. 1, these journal supports 25c and 25d are spaced apart a sufficient distance to embrace the length of the worm 37 and to hold it against movement longitudinally of its axis.

The shaft 39 extends forwardly from the worm 37 through a journal bushing extension 41 which is secured in the journal support 25d. The upper extremity of a supplemental supporting arm 42 is secured by a nut 43 to the outside of the bushing extension 41 and against the journal support 25d. This arm 42 extends downwardly and rearwardly from this connection to a point of attachment to a mounting or bracket member 44 which is adapted to be secured to a suitable support in the same manner as the members 25, 34 and 35, thus lending additional rigidity to the mounting of the entire assembly of mechanism. A tubular extension shaft 45 is secured by means of a bolt 46 to the forward extremity of the shaft 39 and is provided with a pin and slot connection 47 whereby it may be removably engaged by a hand crank member 48.

As will be described more in detail hereinafter, the motor 11 and the hand crank 48 may be selectively utilized to actuate the power-delivering crank 13 and any desired mechanism which may be connected thereto. Only one typical element of such mechanism is illustrated herein, this consisting of a pitman or connecting rod 49 having its upper extremity suitably bored and journaled on a bushing 50 carried by a crank pin portion 13a of the crank member 13. The bushing 50 is secured on the crank pin portion 13a, and the upper end of the rod 49 is held in place thereon, by means of a washer 51 and a nut 52 screwed onto the outer extremity of the said crank pin portion, which is suitably threaded to receive such nut. The rod 49 may be connected to any mechanism which it is desired to actuate by selective operation of the motor 11 and the hand crank 48. When the motor 11 is to be utilized, it is suitably energized from an appropriate source through its conducting leads 53.

In the operation of the mechanism by means of the motor 11, this motor drives the power-delivering crank 13 and connected mechanism through the speed-reducing unit 12. This unit ordinarily has a relatively high ratio of speed reduction (on the order of 2000 to 1, for example) so that a relatively high speed and consequently small and lightweight motor 11 will serve effectively to apply comparatively high torque to the crank 13 and mechanism driven thereby, for operation thereof at a relatively low speed. Such operation may consist, for example, of a cycle of actuation of the crank 13 and connected mechanism from the lowermost position thereof, as shown in the drawings, to the uppermost position thereof, or any desired intermediate position thereof, or vice versa, or may consist of continued rotation of the crank 13 to impart continued reciprocation to the pitman or connecting rod 49 over any desired period of time. The limits of such movements may, of course, be controlled by suitable limit switches (not shown), such as are well known in the art, connected to control the energization and de-energization of the motor 11 so as to effect the desired operating cycle or cycles.

During the operation of the mechanism by means of the motor 11 as described above, the stator element of the motor and the housing of the speed-reducing unit 12 are held in fixed position by means of the bracket mountings of this mechanism and the worm 37 intermeshing with the worm gear 36, which constitutes a non-invertible power transmission. During the motor operation, of course, the hand crank 48 is not utilized, and consequently the worm 37 remains stationary, with the result just described.

In the event, however, of failure of the motor 11 or of the source from which it is energized, or any other condition under which it is desired that the actuable mechanism be actuated by means of the hand crank 48, such actuation may be readily effected. This is done simply by connecting the hand crank to the shaft extension 45 and turning it in either direction as required. This results directly in the rotation of the worm 37 and causes rotation of the worm gear 36 intermeshing therewith and corresponding bodily rotation of the entire assembly comprising the stator and rotor elements of the motor 11, the speed-reducing unit 12 and the power-delivering crank 13. The speed-reducing unit 12 serves under these conditions to lock the crank 13 against rotation relative to the worm gear 36, by reason of the non-invertibility of its mechanism.

Such non-invertibility may be inherent in the mechanism, as in the case of the worm gear 36 and worm 37 intermeshing therewith, or may be brought about by reason of the high ratio of speed reduction in combination with the friction inherent or deliberately provided in the mechanism, including the motor 11, its bearings, brushes, etc. In case increased friction is to be deliberately provided, this result may be accomplished by having the motor 11 equipped with an ordinary friction disc or an electrically controlled brake which is automatically applied whenever the motor is de-energized and released whenever it is energized, as illustrated diagrammatically in Fig. 4. As there shown, a friction disc 54 is secured to any suitably located portion 11c of the shaft of the motor 11. A braking member 55 is urged by a compression spring 56 toward the disc 54 but is adapted to be retracted therefrom upon the energization of a solenoid coil 57 acting upon a core member 58 constituting part of a suitably mounted armature which carries the braking member 55 and is engaged by the spring 56. The solenoid coil 57 is to be connected in such circuit relationship with the motor 11 as to be energized and deenergized concurrently therewith. The braking member 55 will therefore effectively prevent rotation of the disc 54 and thereby prevent relative rotation of the rotor and stator elements of the motor 11 whenever the latter is not energized, but will not interfere with such rotation when the motor is energized. Whether this type of device or any equivalent thereof is employed, it is to be understood that relative rotation between the power-delivering crank 13 and the worm gear 36 cannot occur when the motor 11 is not energized.

Accordingly, the crank 13 and the mechanism connected to be actuated thereby are manually operable by means of the hand crank 48 when the motor 11 is de-energized, the entire assembly mounted in and between the bearings 24 and 30 then being bodily rotated about the common axis of said bearings, which is likewise the axis of rotation of the crank 13.

Normal operation of the mechanism connected to the power-delivering crank 13 may be effected by rotation of said crank through a limited angular range, such as an angle of 180°, more or less. In that event, the electrical connections for energizing the motor 11 may be made through flexible conductors connected to the leads 53 and having sufficient slack therein to accommodate the maximum range of bodily rotation of the motor 11 resulting from operation of the crank 48. However, in case it is desired to provide for unidirectional rotation of the assembly or reversible rotation thereof through such an angular range that the use of such connections would not be feasible, or in case the employment of such slack flexible conductors is impractical or undesirable for any other reason, the energizing connections for the motor 11 may be made through slip rings or equivalent means (not shown). Such means are well known in the art and accordingly require no illustration or detailed description herein.

It is to be understood that the electric motor 11 and the hand crank 48 are disclosed simply as typical operating devices which may be selectively utilized to effect operation of the mechanism which is to be actuated. The invention comprehends the substitution of any other desired prime movers or power sources for either or both of these elements. Regardless of what form of prime movers or power sources are utilized, however, they may be utilized selectively to effect the desired ultimate operation, and such selection is accomplished without involving the provision and operation of any clutches or equivalent devices. All that needs to be done is to energize one or the other of the power sources, and the desired result is directly accomplished.

Various other changes and modifications in the details of design and construction and arrangement of parts may be made without departing from the spirit and scope of the invention, as set forth in the appended claim.

What is claimed as new and is desired to secure by Letters Patent, therefore, is:

A mechanical translating device comprising a motor having a stator element mounted for rotation about a fixed axis and a rotor element rotatable about the same axis with respect to said stator element, an actuatable member rotatable about said fixed axis, a non-invertible power transmission between said rotor element and said actuatable member for effecting rotating of the latter when said motor is energized, an actuating member, and a non-invertible power transmission between said actuating member and said stator element for effecting unitary rotation of said stator and rotor elements, said first-mentioned power transmission and said actuatable member about said fixed axis in response to operation of said actuating member.

ALBERT W. MOONEY.

REFERENCES CITED

The following references are of record in the file of this patent:

UNITED STATES PATENTS

| Number | Name | Date |
|--------|------|------|
| 778,710 | Robinson | Dec. 27, 1904 |
| 1,277,620 | Maas | Sept. 3, 1918 |
| 2,307,781 | Holloman et al. | Jan. 12, 1943 |
| 2,346,303 | Heintz | Apr. 11, 1944 |